Nov. 16, 1948. H. TERHUNE 2,453,875
RAM GUIDE
Filed May 25, 1944 2 Sheets-Sheet 1
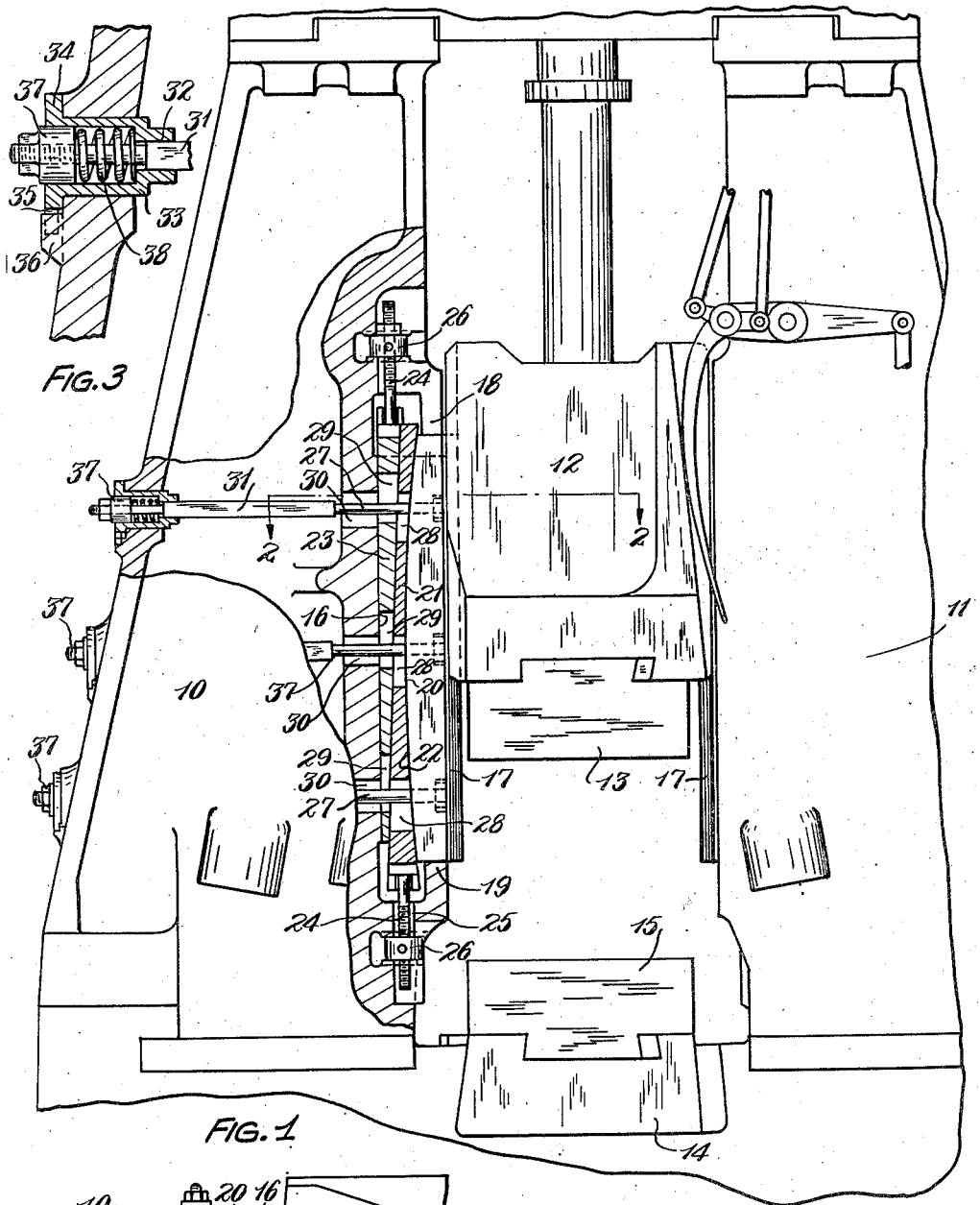
FIG. 3
FIG. 1
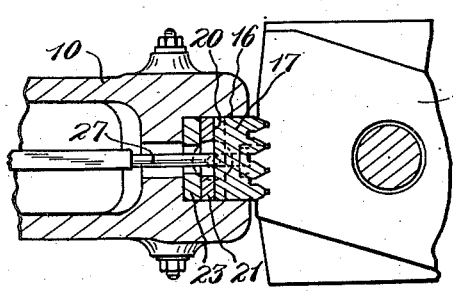
FIG. 2
INVENTOR.
HOWARD TERHUNE
BY
Kwis Hudson Boughton & Williams
ATTORNEYS Nov. 16, 1948.                H. TERHUNE                2,453,875
                               RAM GUIDE
Filed May 25, 1944                                    2 Sheets-Sheet 2

INVENTOR.
HOWARD TERHUNE
BY
Kwis Hudson Boughton & Williams
ATTORNEYS

Patented Nov. 16, 1948

2,453,875

UNITED STATES PATENT OFFICE 2,453,875

RAM GUIDE

Howard Terhune, Cleveland, Ohio, assignor, by mesne assignments, of one-half to Champion Forge Company, Cleveland, Ohio, a corporation of Ohio Application May 25, 1944, Serial No. 537,278

2 Claims. (Cl. 308—3)

This invention relates to improvements in ram guides, that is to say guides for the rams of forging hammers, and has to do more particularly with means for adjusting the guides to compensate for wear.

Various means for accomplishing this purpose are known in the art. However, for the modern large capacity hammers it has become more or less conventional practice to position a vertical wedge behind the ram guide, whereby a solid backing is provided for the guide as well as a means for adjustment. If the wear were the same throughout the length of the guide this type of adjustment would be eminently satisfactory, but the fact is that wear is very uneven, being greatest at the bottom and least at the top. Hence at intervals it becomes necessary with that type of adjustment to remove the guides and plane them off.

Devices have been suggested heretofore for accomplishing a differential adjustment of the guides to compensate for this uneven wear, but so far as I am aware they have incorporated relatively small areas of contact and on that account have failed structurally when attempts have been made to use them in large hammers. In such hammers the weight of the ram and associated parts including the upper die, may be in excess of fifty thousand pounds. With an impact velocity of twenty-six feet per second it will be apparent that such a hammer exerts tremendous force. If the die happens to be so constructed that the center of resistance is several inches to the right or left of the center line of the mass, an extremely heavy side thrust results. Small areas of contact such as are provided by earlier differential adjustment means, are wholly inadequate to take this load. The present invention is directed to the provision of means for effecting differential adjustment while at the same time providing a solid backing for the ram guide.

One of the objects of the invention therefore is the provision of a solid backing plate for the guide which is so constructed that its adjustment vertically will move the guide toward the ram path a greater amount at the bottom than at the top.

Another object is the provision of such differential adjusting means in combination with means for moving the guide bodily toward or away from the hammer path.

Still another object is the accomplishment of the above stated purpose by the use of contact surfaces conforming with a vertical circle of long radius.

Other objects and features of novelty will appear as I proceed with the description of those embodiments of the invention which, for the purposes of the present application, I have illustrated in the accompanying drawings, in which, Fig. 1 is an elevational view, partly in vertical section, of a portion of a forging hammer employing the invention.

Fig. 2 is a horizontal detail sectional view taken substantially on the line 2—2 of Fig. 1.

Fig. 3 is a vertical detail sectional view, illustrating a mounting for one end of a pullback which may be employed in connection with the invention.

Figure 5:
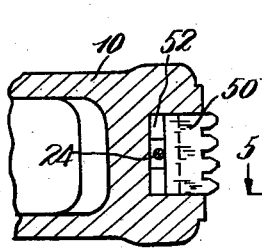
Fig. 5 is a horizontal detail sectional view taken substantially on the line 5—5 of Fig. 4.

Referring particularly to Fig. 1 of the drawings, there is illustrated a portion of a forging hammer having two frame standards 10 and 11, which may be substantially alike except for rights and lefts. There is also illustrated a ram 12 with its die 13 and an anvil 14 with its die 15.

In each of the standards there is a vertically elongated pocket 16 open towards the interior of the hammer, that is toward the path of the ram. A ram guide 17 is mounted within each of these pockets, but extends outwardly therefrom a short distance. The guide is held in position by the side walls of the pocket and by upper and lower abutments 18 and 19. It may move horizontally to a limited extent toward or away from the ram path.

The rear surface 20 of the guide 17 conforms with a vertical circle of long radius. Directly behind and engaging this surface there is a backing plate 21 having a surface 22 conforming with the same circle, which surface engages the surface 20 throughout its extent and forms a firm backing for the guide. The rear surface of the plate 21 is flat and is inclined slightly to the vertical. Between the backing plate 21 and the vertical rear wall of pocket 16 there is a wedge 23 with a forward surface complementary to the rear surface of plate 21.

Plate 21 and wedge 23 are provided with means for independent adjustment vertically. The bottom of plate 21 has a T slot therein which receives the head of a bolt 24 that extends downwardly with considerable clearance through a hole 25. Intersecting the vertical hole 25, there is a horizontal recess sized to fit a nut 26 which is provided with spanner wrench sockets. Obviously, as the nut 26 is turned in one direction or the other, the plate 21 is moved up or down. At the upper end of wedge 23 there is similarly mounted another bolt 24 extending upwardly through a nut 26 which fits between the upper and lower walls of another recess similar to the one at the bottom of the standard. By this means wedge 23 may also be moved either upwardly or downwardly.

In accordance with conventional practice the ram guide is maintained in position by pullbacks 27, each of which is secured at one end in the guide behind the ram contacting surfaces thereof and extends through an opening 28 in backing plate 21, an opening 29 in wedge 23 and an opening 30 in a web of the frame standard. Each of these pullbacks has a portion 31 of square cross-section which fits a square opening 32 in a sleeve 33 that is carried in the outer wall of the standard. This sleeve has a flange 34 which engages a boss on the outer surface of the standard and has a projecting finger 35 which fits between two lugs 36 on the frame, thereby holding the sleeve against rotational movement. The reduced outer extremity of the pullback is threaded to take a nut 37, the inner portion of which is cylindrical to fit the internal surface of the sleeve and the outer portion of which is hexagonal in order that it may be turned with a wrench. Coil spring 38 is interposed between the nut 37 and an end wall of the sleeve. Any torque which is exerted upon the pullback by the turning of nut 37 is absorbed by the square connection 31, 32 between the pullback and the sleeve 33, and hence is not transmitted through the pullback to the ram guide.

Figure 4:
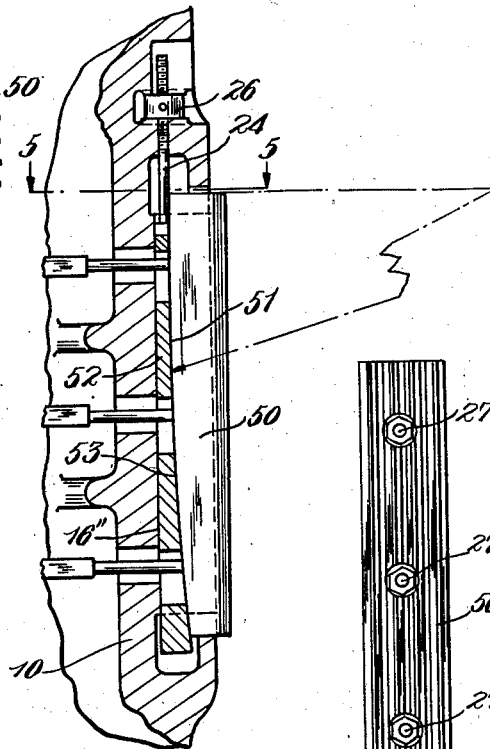
Fig. 4 is a vertical sectional view showing a construction in which the wedge of Fig. 1 is omitted and the center of the curved surfaces is differently disposed than in Fig. 1.
Figure 6:
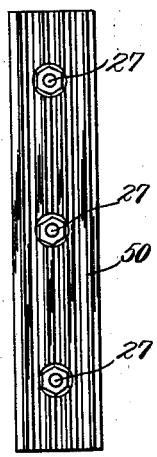
Fig. 6 is an elevational view of a ram guide showing the face thereof which is engaged by the ram.

The construction of Figs. 4 and 5 is similar to that of Fig. 1, but without the wedge. In this figure the ram guide 50 has a rear surface 51 conforming with a vertical circle which has a center on a level approximately with the top of the guide. The plate 52 is straight and vertical at the back for engagement with the rear wall of pocket 16'' and a front surface 53 that is curved upon the same radius as the surface 51. This backing plate is arranged to be adjusted vertically by a bolt and nut 24 and 26 of the character previously described.

*Operation.*—When it is desired to move the ram guide 17 horizontally without tilting, the nuts 37 may be loosened somewhat to relieve any clamping action of the pullbacks 27, and then the operator turns upper nut 26 to move the wedge 23 up or down. If it is moved down for example, the backing plate 21 and the guide 17 are shifted bodily toward the right. If more wear has occurred at the lower end of the guide than at the upper end thereof, as is usually the case, and if it is desired to tilt the guide slightly on this account, the backing plate 21 may be moved upwardly by turning the lower nut 26. This has the effect of raising the center of the circle with which the surface 22 conforms. The ram guide 17, being held against the curved surface of the backing plate, somewhat yieldingly because of springs 38, but being prevented by the abutments 18 and 19 from following the backing plate upwardly, merely tilts to whatever extent is necessary to cause its curved surface 20 to remain in full contact with the surface 22, in other words to cause its center of curvature to follow upwardly the center of curvature of the backing plate. In this manner the lower end of guide 17 moves toward the path of the ram to a greater extent than the upper end thereof.

The operation of the adjusting means of Fig. 4 will be clear from the preceding description of Fig. 1. It provides a relatively great amount of differential adjustment, but includes no provision for bodily movement of the guide 50 toward or away from the ram path.

Figure 7:
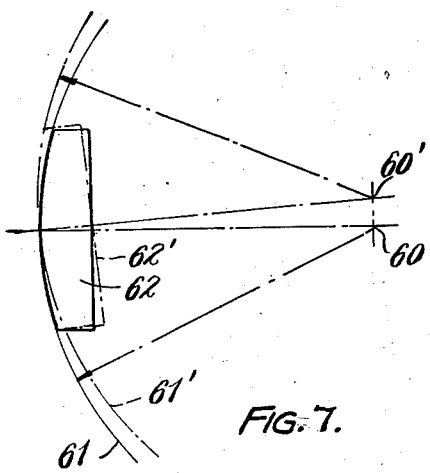
Figs. 7 and 8 are diagrammatic views illustrating the action of the adjusting means.
Figure 8:
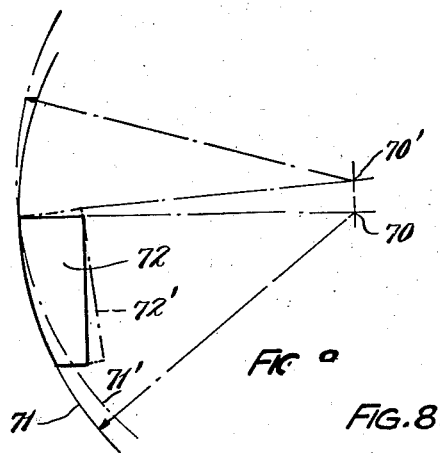

The diagrams of Figs. 7 and 8 illustrate the effect of differences in the level of the center of curvature of the circle with which the curved surfaces of the backing plate and ram guide conform. Where, as in Fig. 7, the original center of curvature 60 for a circle 61 conforming with the curved surface of guide 62 is at a level approximately midway between the top and bottom of guide 61, the shifting of the backing plate upwardly will throw the center of the circle to a new position 60', which means that the curved surface at the rear of the guide must adjust itself to conform with the broken line arc 61', thereby effecting a tilting of the guide to the broken line position 62' illustrated in the figure. It will be noted that this retracts the upper end of the guide to approximately the same extent as it advances the lower end thereof. With this disposition of the center 60, 60', it is advisable from a practical standpoint to employ additionally a wedge such as the wedge 23 of Fig. 1, as otherwise the necessary adjustment for the lower end might provide too much clearance at the upper end of the ram travel.

In Fig. 8 the center 70 of the original circle 71 with which the rear curved surface of ram guide 72 conforms, is disposed approximately on a level with the top of the guide, as in Fig. 4. In this case when the backing plate 52 is raised the center of the circle is shifted upwardly to the point 70', which requires that the guide 72 tilt to such an extent that its rear curved surface shall conform with the broken line circle 71', the guide then taking the broken line position 72'. Here the tilting of the guide is such that its bottom moves toward the ram path while the upper end remains approximately stationary.

It will be understood of course that the selection of centers at levels between those illustrated in Figs. 7 and 8 will produce effects intermediate the effects illustrated in those figures. It will also be understood that the diagrams are distorted in that the radius of the circles shown is much shorter in comparison with the heights of the guides 62 and 72 than it would be in practice. The principles of operation are not affected by this distortion however. In practice the amount of differential adjustment required is but a small fraction of an inch, and hence the tilting of the guide is slight. In both forms of the invention however, a solid backing is maintained regardless of the amount of tilt.

While from a practical standpoint it appears desirable to hold the ram guide against movement vertically and to move the backing plate up or down for adjustment purposes, it is obviously possible to reverse this arrangement, that is, to hold the backing plate against vertical movement and to move the ram guide up or down slightly in order to obtain differential adjustment.

Having thus described my invention, I claim:

1. In a forging hammer, a frame standard having a vertical pocket, a ram guide held therein against vertical movement, the rear surface of said guide being curved vertically to conform with a circle of long radius, a backing plate mounted in said standard behind said guide having a guide engaging surface conforming with the same circle, means for adjusting said backing plate vertically, to tilt the guide vertically, and a vertically movable wedge behind said backing plate for moving the backing plate and guide horizontally.

2. In a forging hammer, a frame standard having a vertical pocket, a ram guide held therein against vertical movement, the rear surface of said guide being curved vertically to conform with a circle of long radius, a backing plate mounted in said standard behind said guide having a guide engaging surface conforming with the same circle, a vertically movable wedge behind said backing plate for movement of the backing plate and guide horizontally, means at one end of the wedge for moving it vertically, and means at the opposite end of the backing plate for moving it vertically.

HOWARD TERHUNE.

REFERENCES CITED

The following references are of record in the file of this patent:

UNITED STATES PATENTS

| Number | Name | Date |
| --- | --- | --- |
| 1,382,571 | Terhune | June 21, 1921 |
| 2,140,658 | Van Sittert | Dec. 20, 1938 |